(12) United States Patent
Wilkinson

(10) Patent No.: US 8,945,696 B2
(45) Date of Patent: Feb. 3, 2015

(54) ROUND PAPER TOWEL AND NAPKIN PRODUCT

(71) Applicant: Neil Wilkinson, Berwyn, IL (US)

(72) Inventor: Neil Wilkinson, Berwyn, IL (US)

(*) Notice: Subject to any disclaimer, the term of this patent is extended or adjusted under 35 U.S.C. 154(b) by 0 days.

(21) Appl. No.: 13/728,616

(22) Filed: Dec. 27, 2012

(65) Prior Publication Data

US 2014/0186571 A1 Jul. 3, 2014

(51) Int. Cl.
*B32B 3/00* (2006.01)
*A47G 11/00* (2006.01)
*A47K 10/16* (2006.01)
*B32B 29/00* (2006.01)
*A47J 36/02* (2006.01)

(52) U.S. Cl.
CPC .............. *A47G 11/001* (2013.01); *A47K 10/16* (2013.01); *B32B 29/005* (2013.01); *A47J 36/027* (2013.01)

USPC ..................... 428/64.1; 428/195.1; 428/537.5

(58) Field of Classification Search
CPC ....... B32B 29/00; B32B 29/005; A47G 23/03
USPC ............................................. 428/64.1, 535.5
See application file for complete search history.

(56) References Cited

U.S. PATENT DOCUMENTS

| D631,269 S * | 1/2011 | Davenport ..................... D6/518 |
| 2004/0028935 A1 * | 2/2004 | Hauke ......................... 428/537.5 |
| 2004/0224059 A1 * | 11/2004 | Esparza ........................ 426/243 |

* cited by examiner

*Primary Examiner* — Elizabeth Mulvaney
(74) *Attorney, Agent, or Firm* — The John Marshall Law School Patent Clinic

(57) ABSTRACT

An apparatus for Round Paper Product and Napkin product is to provide to provide a more practical, attractive, and environmentally sound alternative to standard, square shaped paper towels and napkins featuring a distinct circular shape for easy placement in microwaves. ea

5 Claims, 3 Drawing Sheets

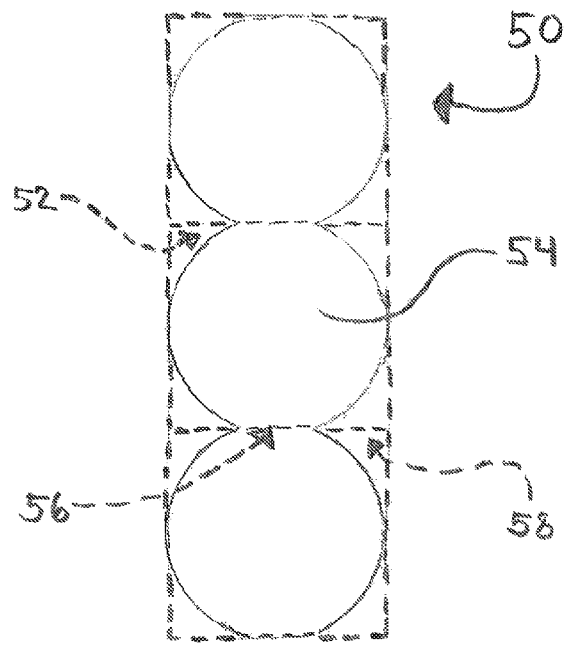
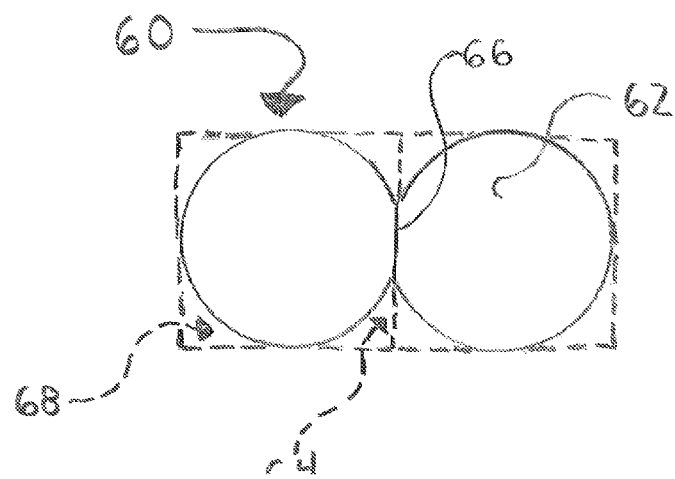

ROUND PAPER TOWEL AND NAPKIN PRODUCT

SUMMARY OF THE INVENTION

The circular shape of this product would provide an easy fit for microwave interiors, as the rotating base of these appliances is also circular. The Round Paper Towel and Napkin Product would prove to be more efficient than a square towel. The chemically free Round Paper Towel Product would also be environmentally friendly, saving approximately 12 to 15 sheets per roll. The Round Napkin Product will also have a huge advantage as well, saving 15 to 20 sheets per box.

BRIEF DESCRIPTION OF THE DRAWINGS

FIG. 5 is an illustration of the square paper towel outer edges being cut away, leaving the round shape intact with a perforation between each sheet.

FIG. 6 illustrates the napkin in the unfolded position showing the outer edges being cut away, leaving the round shape and center being the folded area.

DETAILED DESCRIPTION

The Round Paper Towel would be made available in a roll form with each roll containing 55 two-ply sheets of circular paper and would measure approximately eleven inches (11") in length. At the same time each towel could contain a circumference of the same amount (11"). As with standard paper towel rolls, the roll would feature a 3½" perforation between each sheet to facilitate an easy and neat tear-off from the roll.

The Round Napkin Product is also a circular shape and would be available in a decorative box containing 50 per count and would measure approximately 6½" inches in diameter with a 3½" fold as a single sheet folded in half. Both paper towels and napkins in this line would be available in plain white and a wide array of stately and whimsical prints. These prints would be available in various themes, such as holidays, special occasions, sports and animated themes.

Figure 1:
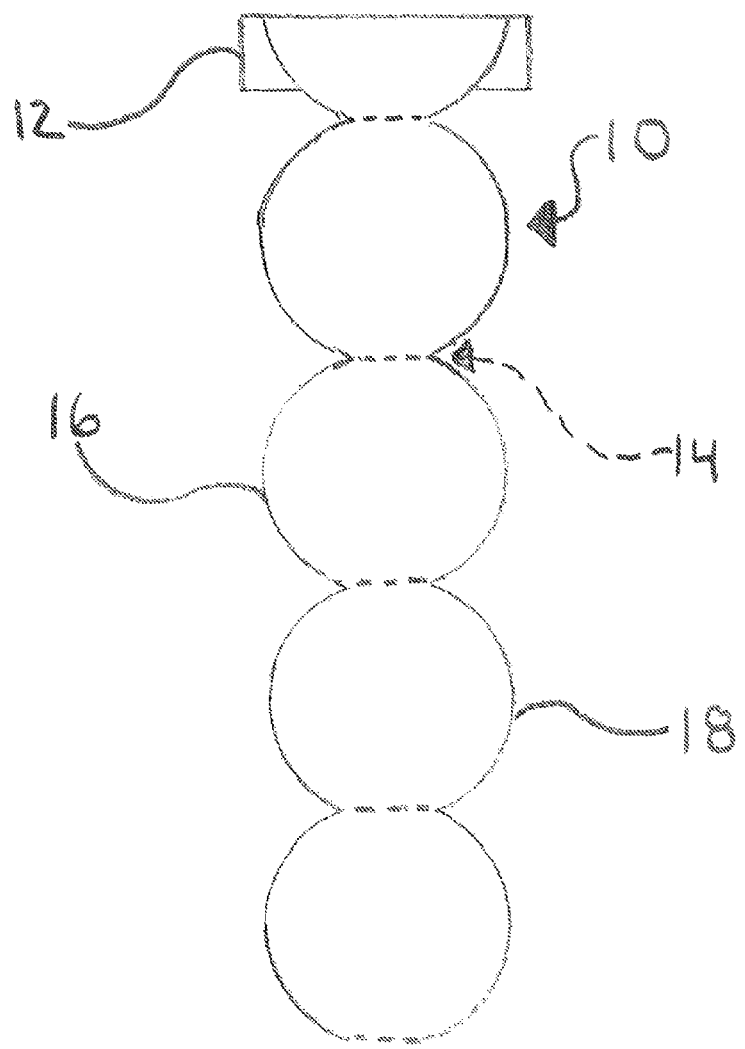
FIG. 1 is an illustration of the round shaped form in accordance with the present invention showing the placement of perforations.

Referring to the Drawing to FIG. 1 relates to convenience rolls by the numeral 10. More particularly, FIG. 1 shows a round shaped form in accordance with the present invention made roll Form 12 including perforations 14. The round shape 18 follows 16 with perforation 14 for an easy separation between portions.

Figure 2:
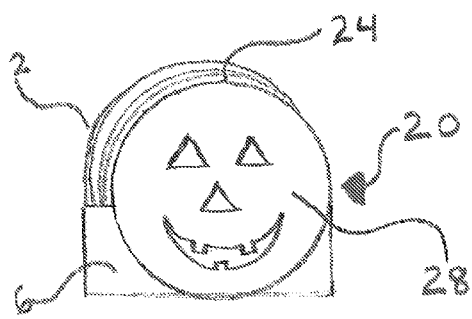
FIG. 2 is a perspective view of the decorative NAPKIN BOX with a round open top where the individual napkins would easily be dispensed.

Referring now to FIG. 2 a box dispenser by the numeral 20. Box 26 includes an opening at top 24 which the round shaped napkins 22 will be dispensed. 26 will also display an animated print on the outside of the box referring to 28 depending on the theme selected.

Figure 3:
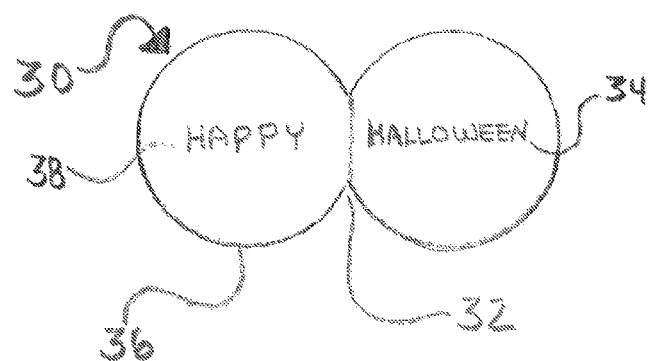
FIG. 3 Illustrates the round napkin in the open position and showing the inside matching the outside animated theme or special occasion. For example, Pumpkin print outside and Happy Halloween on the inside.

Referring now to FIG. 3 yet another illustration of the invention that follows the round napkin in the open position by numeral 30. The round open shaped napkin 36 shows a folded section 32 in the center. Also, when opened, the inside on both sections 38 and 34 will illustrative what title of them to be written.

Figure 4:
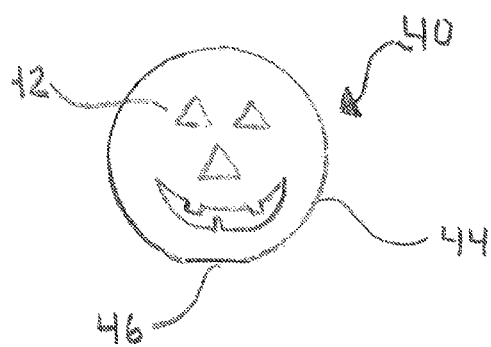
FIG. 4 is an illustration of the single round shaped napkin in the closed position. For example, a soccer theme.

Referring now to FIG. 4 yet another illustrated view by numeral 40. The round napkin 44 which shows itself in the closed position with the folded area 46 and the outside of the napkin 42 will show for example an animated theme depending on which holiday, sports or special occasion selected.

Now looking at FIG. 5 which is shown by numeral 50. This illustration shows the areas 52 and 58 being cut away areas and leaving the round shape 54 intact with the perforated section of 56.

Referring now to FIG. 6 which is shown by numeral 60. 62 the round napkin also shows the cut away area 64 and 68 leaving the napkin without any corners. 66 is the folded area of the napkin.

What is claimed is new and desired to be protected by Letters Patent is set forth in the appended claim:

1. A round paper towel roll comprising:
   an interior roll core;
   a plurality of sheets of substantially circular shaped paper towels, each of said plurality of sheets being continuously joined to one another, said each of the plurality of sheets being separable from one another at a perforation of 3.5 inches; and
   a printable exterior surface of said each of the plurality of sheets for printing decorative themes in the entirety of the printable exterior surface for each of the plurality of sheets.

2. The round paper towel roll according to claim 1, wherein the each of the plurality of sheets comprises a length of 11 inches.

3. The round paper towel roll according to claim 1, wherein the plurality of sheets comprises 55 two-ply sheets.

4. A circular paper napkin assembly comprising:
   a box dispenser having an opening and a width;
   a plurality of substantially circular paper napkin sheets disposed in the box dispenser accessible through the opening, each of the substantially circular paper napkin sheets comprises two substantially circular shapes each having a diameter of 6.5 inches, said each of the substantially circular paper napkin sheets having a folding line of 3.5 inches in length, and
   a printable exterior surface of said each of the substantially circular shapes for printing a theme using the printable exterior surface of each of the substantially circular shapes on each of the substantially circular paper napkin sheets.

5. The circular paper napkin assembly according to claim 4, wherein the width of the box dispenser is greater than the diameter of the each of the substantially circular paper napkin sheets.

* * * * *